United States Patent  [15] 3,703,629
Hanbicki  [45] *Nov. 21, 1972

[54] PNEUMATICALLY OPERATED COUNTING DEVICE

[72] Inventor: Richard B. Hanbicki, Princeton Junction, N.J.

[73] Assignee: Madatron Corporation, Rocky Hill, N.J.

[*] Notice: The portion of the term of this patent subsequent to Dec. 8, 1987, has been disclaimed.

[22] Filed: June 1, 1970

[21] Appl. No.: 42,228

[52] U.S. Cl. .................................. 235/98, 73/406
[51] Int. Cl. .............................. G06m 11/00
[58] Field of Search ......... 73/37, 149, 290 B; 235/98, 235/200, 201

[56] References Cited

UNITED STATES PATENTS 3,545,674  12/1970  Hanbicki ................. 235/98

Primary Examiner—Richard B. Wilkinson
Assistant Examiner—Lawrence R. Franklin
Attorney—Ostrolenk, Faber, Gerb & Soffen

[57] ABSTRACT

Apparatus for counting large numbers of small articles of uniform size. The time duration taken for the return to ambient pressure of a container housing the parts is compared against the occurrence of the same phenomenon, an empty container employed as a standard. Comparison of these phenomena (either electronically, mechanically or manually) provides an accurate determination of the total number of parts being counted.

The ambient pressure-sensitive switch utilizes optical means for sensitive, accurate detention of pressure, and the encoder system employed provides direct measurements of volume as opposed to time duration of the container pressures (i.e., which are required to return to ambient condition).

9 Claims, 4 Drawing Figures

INVENTOR.
RICHARD B. HANBICKI
BY
Ostrolenk, Faber, Gerb & Soffen
ATTORNEYS

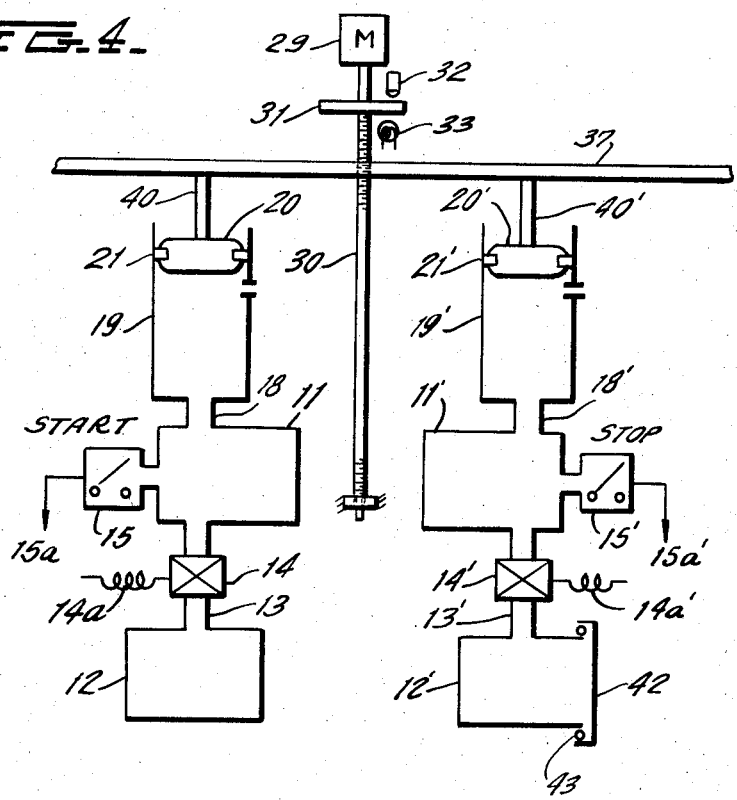
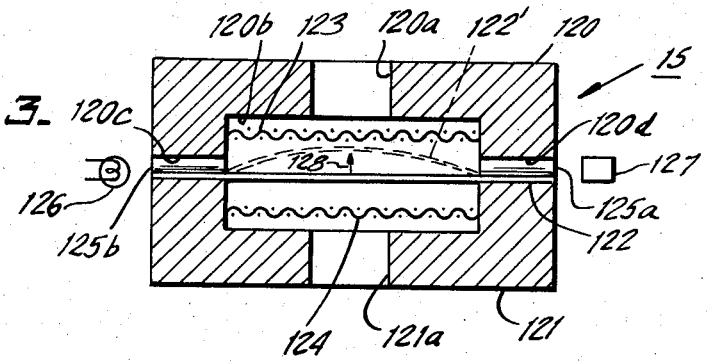
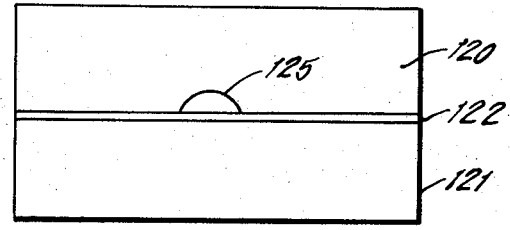

PNEUMATICALLY OPERATED COUNTING DEVICE

The present invention relates to counting devices, and more particularly to a novel system for simply and rapidly counting a large quantity of substantially uniform parts wherein an accurate count is obtained through the use of pneumatic principles and novel ambient pressure-detector means and electronic encoder means.

In copending application Ser. No. 765,152, filed Oct. 4, 1968, now U.S. Pat. No. 3,545,674 issued Dec. 8, 1970 and assigned to the assignee of the present invention, there is described a plurality of preferred embodiments capable of counting relatively large quantities of small components of uniform size. The present invention is directed to improved hardware capable of performing the counting operations described in the above-mentioned copending application through the provision of novel encoder means capable of generating electronic pulses directly representative of a volume measurement. In addition thereto, the present invention provides a novel pressure-sensitive switch capable of measuring a change from positive to negative pressure (ambient point) through the use of electro-optical means so as to yield a pressure-sensitive switch means which is highly accurate, extremely reliable and has a long, useful operating life.

The present invention is characterized by providing a counting system in which first, second, third and fourth containers, connected to associated fifth, sixth, seventh and eighth containers, respectively, by suitable valve means are initially elevated to predetermined pressure level. The valve means are then automatically closed after a predetermined time sufficient to equalize the pressures within the four pairs of containers and to allow for thermodynamic unbalance to subside. Two of the group of fifth and sixth, seventh and eighth containers are respectively filled with the parts whose quantity is to be determined and a sample quantity. The depressurizing operation is commenced immediately after pressure-equalization in the chambers, at which time the optical-type pressure-sensitive switch means of the first through the fourth containers are selectively activated, enabling pulses from an encoder directly coupled to the depressurizing piston means to be fed into register means within a predetermined time interval controlled by the operation of the optical-type pressure-sensitive switch means of the containers which sense the occurrence of a predetermined pressure level.

Due to the unique relationship between the pressurizing-depressurizing means and the encoder means, the register receiving the pulses from the encoder means which are generated between the "start" and "stop" pressure switches for the large parts group divided by the sample parts group directly represents the volume of the parts to be counted which may alternatively be converted into the total quantity of parts by electronic means (i.e., dividing the count in the first register by a count in a second register representative of the component volume), thereby being capable of generating in a third register (contemporaneously with the counting operation) a count exactly representative of the number of parts being counted.

Alternatively, the count developed in the first register may be compared against a set of pressure-volume curves to obtain the quantity of parts.

The pressure-sensitive switch means employed is comprised of a very thin, flexible membrane which acts as a barrier between the container and ambient pressure. Suitable gas porous, screening means prevents undue expansion of the pressure-sensitive membrane, and optical means are employed across diametrically opposed points of the membrane to generate a pulse as soon as ambient pressure is achieved to thereby accurately generate the "start" and "stop" pulses employed to control application of the encoder pulses to a counting register to thereby generate alternatively either the volume of the quantity being measured or the actual quantity (which may be obtained through a simple division operation).

It is, therefore, one object of the present invention to provide a novel means for counting relatively large quantities of relatively small uniform parts and employing a pneumatic concept wherein the output pulses generated by the counting device are directly representative of either total volume or total quantity of the parts being measured.

Another object of the present invention is to provide a novel means for counting relatively large quantities of relatively small uniform parts and employing a pneumatic concept wherein the output pulses generated by the counting device are directly representative of either total volume or total quantity of the parts being measured, and wherein novel pressure-sensitive switch means of an optical-type are employed to very accurately control the generation of the pulses representing the total quantity of parts being counted.

These as well as other objects of the present invention will become apparent when reading the accompanying description and drawings in which:

FIG. 3 is a detailed sectional view of the pressure-sensitive switches employed in the present invention.

FIG. 4 is an alternative embodiment of the pneumatic counting apparatus of FIG. 1.

Figure 1:
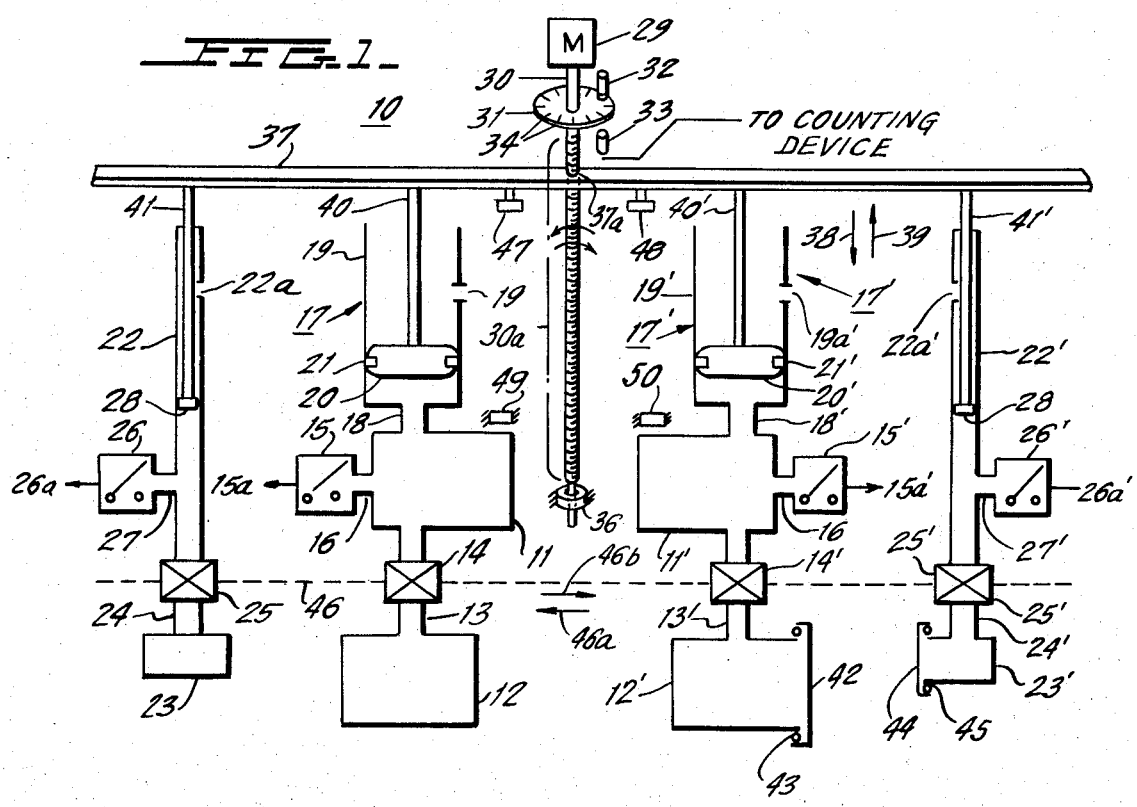
FIG. 1 is a diagram showing the pneumatic counting device of the present invention.

The pneumatic counting apparatus 10 shown in FIG. 1, is comprised of two matched pairs of containers (i.e., four pairs of containers in toto). A first pair of containers 11 and 12 have interior volumes $V_1$ and $V_2$, respectively, which are known and are equal to one another ($V_1 = V_2$). The interiors of the containers are coupled to one another through a conduit 13 which is selectively opened and closed by valve means 14. A pressure-sensitive switch 15 is coupled to the interior of chamber 11 by conduit 16. A pressurizing-depressurizing source 17 is coupled to chamber 11 by means of conduit 18. The pressure source, in the embodiment of FIG. 1, is comprised of a piston and cylinder combination 19–20, respectively. The cylinder is provided with a vent 19a for reducing pressure within the cylinder interior to ambient pressure when the piston is in the uppermost position relative to FIG. 1. The piston may be provided with an O-ring 21 seated within a suitable annular groove provided in the piston.

A second pair of smaller sized containers, namely containers 22 and 23 are coupled to one another through a conduit 24 which may be selectively opened and closed by valve means 25. Container 22 is actually an elongated hollow tubular member whose volume ($V_3$) is known. The volume ($V_4$) of container 23 is also known. A switch means 26 is coupled to the interior of container 22 through conduit 27. The narrow tubular member 22 forms a portion of the pressurizing-depressurizing source which is comprised of a piston 28 mounted for reciprocal movement within the upper portion of tubular member 22.

The remainder of the pneumatic arrangement is substantially identical to that already described wherein like components have been indicated by primed numbers. Thus, the chambers 11' and 12' are identical to the chambers 11 and 12, respectively, the pressure-sensitive switches 15 and 15' are identical, and so forth. In addition thereto, the interior volumes of containers 11' ($V_{1'}$) and 12' ($V_{2'}$) are equal to one another and are equal to the interior volumes of chambers 11 and 12 (i.e., $V_1 = V_2 = V_{1'} = V_{2'}$).

Likewise, the smaller containers 22' and 23' are identical to the chambers 22 and 23, respectively, the pressure-sensitive switches 26' and 26 are identical and so forth. The interior volumes of containers 22' ($V_{3'}$) and 23' ($V_{4'}$) are equal to one another and are equal to the interior volumes of chambers 22 and 23 (i.e., $V_3 = V_4 = V_{3'} = V_{4'}$).

The pistons 20, 20', 28 and 28' are operated in unison by motor means 29 having an output shaft 30. A circular disc 31 is rigidly secured for rotation with shaft 30. A constantly energized light source 32 is positioned upon one side of the disc and a photo-sensitive device 33 is positioned upon the other side of the disc. Disc 31 is provided with a coded pattern of contrasting light and dark areas 34 arranged in radial fashion adjacent the periphery of the disc so as to cause the light rays from source 32 to be interrupted in a regular and periodic fashion as the contrasting transparent and opaque areas pass between the light source-photo-cell components. The output of photo-cell 33 is coupled to the counting device to be more fully described with respect to FIG. 2.

The output shaft 30 is threaded over portion 30a thereof which is substantially the major portion of the shaft. The opposite end of the shaft is journalled within a stationary mounted bearing assembly 36 which may be secured to any suitable supporting structure so as to permit the shaft 30 to be freely rotated while preventing the shaft from experiencing any wobbling or other movement transverse to he longitudinal axis of the shaft. A rigid metallic bar 37 is provided with a tapped opening 37a intermediate its ends, which tapped opening threadedly engages the threaded portion 30a of shaft 30. Since driving bar 37 (as will be made obvious hereinbelow) is prevented from experiencing any rotational movement about the axis of its opening 37a (which is colinear with the longitudinal axis of shaft 30), angular rotation of shaft 30 in a first direction causes the driving bar 37 to be driven downwardly in a direction shown by arrow 38 while angular rotation of shaft 30 in the reverse direction causes driving bar 37 to be linearly driven in the upward direction as shown by arrow 39.

The pistons 20, 20', 28 and 28' are each mechanically coupled to driving bar 37 by means of piston rods 40, 40', 41 and 41', respectively, which have their lower ends mechanically coupled to their associated pistons and which have their upper ends mechanically coupled to driving bar 37 at spaced intervals along the driving bar. This arrangement causes the four piston rods 40, 40', 41 and 41' to move in unison to selectively perform either the pressurizing or depressurizing operation.

Chamber 12' is provided with a cover member 42, shown in schematic fashion, which may be removed for the purpose of inserting a large batch of components to be counted, which operation will be more fully described. Either the cover or the remainder of the chamber may be provided with an O-ring or other form of gasket 43 to provide a good airtight seal for the chamber after insertion of the parts or other components and replacement of the cover 42 upon the chamber. In a like manner, small chamber 23' is provided with a cover 44 which is made removable for inserting a "sample" batch of components of the same type placed in chamber 12'. This chamber assembly may likewise be provided with an O-ring or gasket 45 to provide a good airtight seal for the chamber.

A brief description of the operation of apparatus 10 shown in FIG. 1 is as follows:

A "sample" quantity of the large batch of components to be counted (for example, a group of ten such components) is inserted into chamber 23' and cover 44 is then replaced. The remainder of the entire batch of components is inserted into chamber 12' and cover 42 is replaced. Valve means 14, 14', 25 and 25' are all ganged together by means of an elongated rod represented by dotted line 46. Initially, rod 46 of the above-mentioned valves and thereby connect the interiors of chambers 11, 11', 25 and 25' to the interiors of chambers 12, 12', 23 and 23', respectively. Motor 29 is operated so as to return driving bar 37 to its uppermost position (which is usually the position occupied by driving bar 37 upon the completion of a previous counting operation). With the driving bar 37 in the uppermost position, pistons 19, 19', 28 and 28' are all positioned above the openings 19a, 19a', 22a and 22a', respectively, provided in their associated chambers so as to place the interior volumes of all eight chambers at ambient pressure.

Motor means 29 is then operated so as to rotate in the angular direction which causes driving bar 37 to be moved in a direction shown by arrow 38 whereby the air in all of the four pairs of chambers is compressed. The energization of motor means 29 is continued until stop members 47 and 48 rigidly mounted to one side of driving bar 37 abut stationary mounted stops 49 and 50, respectively. The volumetric ratios of chambers 19 and 19' may, for example, be approximately 1/15th of the combined volume of chambers 11–12 and 11'–12', respectively, so as to raise the pressure within these chambers to approximately 1 psi. Obviously, any other ratio may be employed if desired.

All of the aforementioned valves are maintained in the open position for a period sufficient to allow any thermodynamic unbalance to subside. It has been found that the time interval of 15 –30 seconds is more than sufficient. After this time duration has elapsed, rod 46 is moved in a direction shown by arrow 46b to simultaneously close all of the valves 14, 14', 25 and 25'.

Immediately thereafter, motor means 29 is energized so as to reverse the rotation of shaft 30 causing driving bar 37 to move in the direction shown by arrow 39 in order to decompress chambers 12, 12', 23 and 23' undergo no decompression since they are disconnected from their associated piston-cylinder assemblies as a result of the previous closure of valves 14, 14', 25 and 25', respectively.

Each of the pressure-sensitive switches 15, 15', 26 and 26' is designed to be activated to generate an output pulse which appears at their output terminals 15a, 15a', 26a and 26a', respectively, when the switches sense a return to the ambient pressure condition. Since chambers 12 and 23 contain no parts (i.e., are completely empty), the pressure levels in chambers 11 and 22 will be lower than the pressure levels in chambers 11' and 22', due to the fact that components have been inserted into the chambers 12' and 23', respectively. Thus, switches 15 and 26 will generate output pulses prior to the time that output pulses will be generated by switches 15' and 26'.

Switches 15 and 15' operate as a cooperative pair of switches, and likewise, switches 26 and 26' operate as a pair of cooperative switch devices.

The operation is such that the output pulse developed by pressure-sensitive switch 15 enables a gate to permit the passage of pulses developed by photo-cell device 33 into a counting device (to be more fully described). The pulse generated by pressure-sensitive switch 15' disables the above-mentioned gate (to be more fully described) to prevent any further pulses developed by photo-cell 33 from reaching the aforementioned counting device. Pressure-sensitive switches 26 and 26' operate in a similar manner to control the flow of pulses developed by photo-cell 33 to a second counting device. The count in the first counting device is then immediately divided by the count in the second counting device to generate an output which is a binary coded representation of the total number of parts contained within chamber 12'. This count may be displayed upon any suitable display device and/or may be printed out by a suitable printing device.

Figure 2:
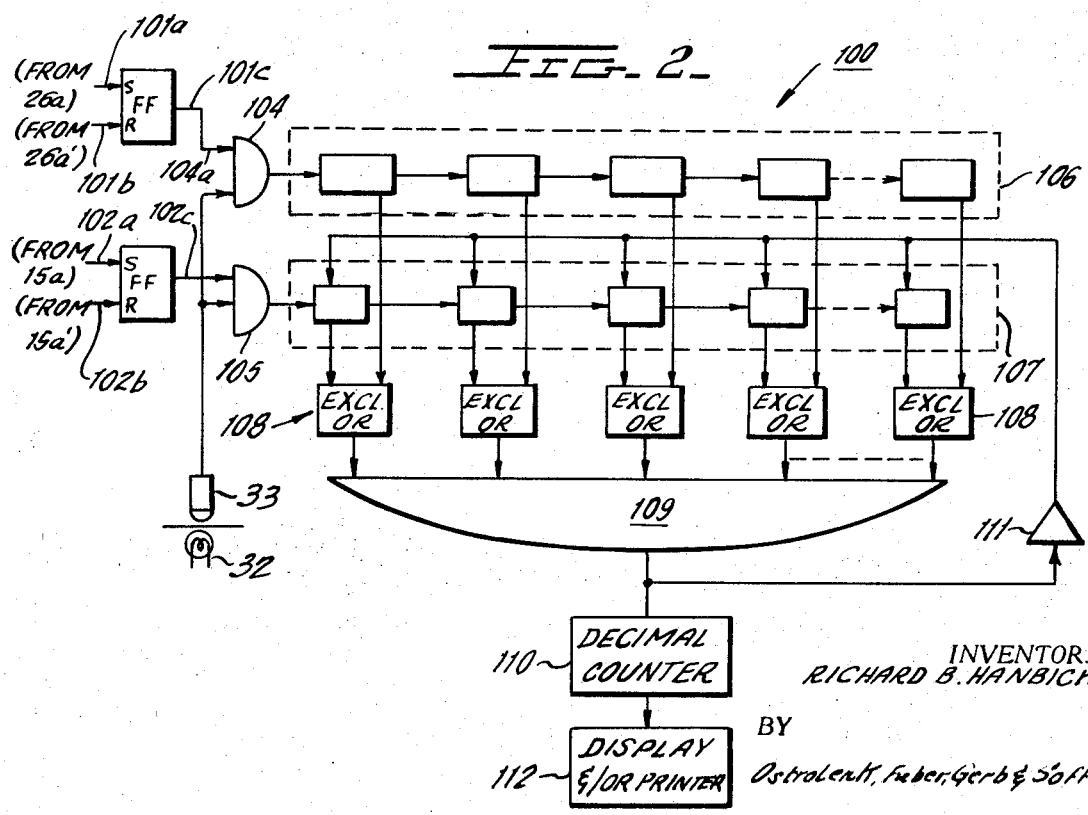
FIG. 2 is a block diagram showing the system electronics employed with the pneumatic counting device of FIG. 1.

FIG. 2 shows the electronics for the parts counter system which were mentioned briefly hereinabove. The system electronics 100 shown in FIG. 2 is comprised of a first counter or register 106 and a second counter or register 107. Both counters are comprised of plurality of bistable stages connected to one another to accumulate a count therein and have a capacity which is sufficient for accumulating an extremely large count representative of the large quantity of parts being counted.

The outputs of associated bistable stages of each of the counters are applied to associated Exclusive OR gates 108 for comparison purposes to be more fully described. The outputs of each of the Exclusive OR gates are ANDED in AND gate 109 whose output is simultaneously applied to a decimal counter 110 and an amplifier 111 for the purpose of periodically resetting counter 107 in a manner to be more fully described. The output of decimal counter 110 is applied to a display means 112 for displaying the appropriate count. Counter 110 may be an accumulative counter or register similar in nature to counters 106 and 107 and be further provided with suitable logical circuits for converting a binary count into a decimal representation. The decimal output signals are applied to a display device 112 which may be of the type described in copending application Ser. No. 718,553, filed Apr. 3, 1968, now abandoned in favor of continuation application Ser. No. 123,878, filed Mar. 12, 1971 and assigned to the assignee of the instant invention. For purposes of understanding the present invention, It is sufficient to understand that the display device is capable of displaying a decimal number comprised of a number of decimal digit positions and having a capacity to display the output number which represents the total number of parts counted. Display device 112 may also be either a visual display device and/or printer capable of providing either a print-out or a visual display, or both.

The output of light-sensitive device or photocell 23 shown in FIG. 1 and reproduced in FIG. 2, is simultaneously applied to respective input terminals of a pair of AND gates 104 and 105. The remaining input terminals of AND gates 104 and 105 are respectively connected to output terminals 101c and 102c of bistable flip-flop circuits 101 and 102, respectively. Each of the flip-flop circuits is provided with set input terminals 101a and 102a, respectively, and reset input terminals 101b and 102b, respectively. Set input terminals 101a and 102a are respectively coupled to the outputs 26a and 15a of the pressure-sensitive switches 26 and 15. Reset input terminals 101b and 102b' are respectively coupled to the output terminals 26a' and 15a' of pressure-sensitive switches 26' and 15'.

The operation of the electronics of FIG. 2 is as follows:

Assuming that the air in the chambers has been compressed (i.e., assuming that the driving bar 37 has reached its downward most position); that any thermodynamic unbalance condition has subsided; and that the valves 14, 14', 25 and 25' have been closed; motor 29 is reversed to cause the driving bar 37 to move to its uppermost position. Code disc 31 rotates in unison with the shaft 30 causing pulses to be generated by photosensitive device 33. It should be understood that each of these pulses represents an increment of volume since the pistons 19, 19', 28 and 28' are moving upward in their piston chamber through small but finite increments as the motor shaft 30 rotates. These pulses are applied directly to one input terminal of both AND gates 104 and 105. Initially, however, the pulses are blocked from passing through the AND gates until the remaining input terminals are high.

As the four pistons continue to move in the direction of decompression, pressure-sensitive switches 26 and 15 will be the first to become activated since the chambers (22 and 11, respectively) which they are monitoring are at the lower pressure levels, As soon as these switches become activated, they generate output pulses which are applied to the set input terminals 101a and 102a, respectively, of bistable flip-flops 101 and 102. This causes the output terminals 101c and 102c to go high and thereby open gates 104 and 105. The output pulses developed by photo-cell 33 are thus simultaneously applied to the loading stages of registers 106 and 107.

Pressure-sensitive switches 26' and 15' will operate at later time intervals indicative of the fact that these chambers have reached a predetermined lower pressure level, at which time output pulses will be developed by these pressure-sensitive switches to apply reset pulses to the input terminals 101b and 102b of bistable flip-flops 101 and 102, respectively. These reset input pulses causes the output terminals 101c and 102c to go low and thereby prevent any further output pulses developed by photo-sensitive device 33 from being passed to registers 106 and 107.

The count developed in register 106 represents the volume occupied by the "sample" batch of components. This count will be quite small and will terminate well before the count terminates in counter 107.

Each time the count in counter 107 contains the identical count accumulated in counter 106, the Exclusive OR gates 108 will be enabled causing AND gate 109 to develop an output pulse which is simultaneously applied to counter 110 and amplifier 111. Amplifier 111 has its output coupled to the reset input terminals of all stages of counter 107 automatically resetting counter 107 automatically to a zero count. Since pulses will continue to be applied to counter 107 well after counter 106 has reached its final count, counter 107 will be reset a number of times with each resetting being caused by the development of an identical count in counter 107 to the count accumulated in counter 106. This operation is effectively an operation of division in which the number of times which counter 107 is reset represents the proportional volume differences occupied by the large batch of parts compared with the "sample" batch. Assuming, for example, that counter 107 is reset 100 times, this indicates that the volume occupied by the large parts of components is 100 times greater than the volume occupied by the "sample" batch of components. Selecting a sample batch of ten components yields an indication that the number of components yields an indication that the number of components in the large batch to be counted is 100 times as greater or a total of 1,000 components. By setting decimal counter 110 accordingly, this output may be directly related to total components as opposed to proportional volume. The output of display device 112 thus may prepare either a visual display or a printed display, or both.

As an alternative to the electronics of FIG. 2, the Exclusive OR gate group 108 and the AND gate 109 may be replaced by a divider circuit which operates to divide the count in counter 107 by the count in counter 106 to generate a binary coded count indicative of the total number of parts in the large batch being counted. The divider circuit output may then be coupled through a logical gating circuit to convert the output into decimal form which may then be displayed by display device 112. Obviously, any other electronics hardware may be employed to compute the final count.

FIG. 3 shows a cross-sectional view of one of the pressure-sensitive switches (for example, switch 15). It should be understood that the remaining pressure-sensitive switches are substantially identical in arrangement and operation.

As shown in FIG. 3, the pressure-sensitive switch 15 is comprised of first and second metallic rings 120 and 121. Each of the rings is provided with a central opening 120a and 121a, respectively. The metallic rings are further provided with circular-shaped cavities 120b and 121b, respectively, which communicate with the central openings 120a and 121a, respectively. A thin resilient membrane 122 is sandwiched between rings 120 and 121 to form an effective airtight barrier which completely seals off opening 121a from opening 120a. Ring 120 is coupled by any suitable means (not shown) so as to cause the opening 121a to communicate with the interior of container 11 through conduit 16. If desired, the conduit 16 may be omitted and ring 121 may be directly secured to the surface of container 11 with opening 121a operating effectively as the conduit 16.

Opening 120a in ring 120 communicates with the atmosphere.

The hollow interior region defined by cavities 120b and 121b is provided with a pair of circular-shaped screens 123 and 124 positioned on opposite sides of diaphragm 122. Ring 120 is provided with a pair of semi-circular shaped grooves 120c and 120d, respectively, (one of which is shown in FIG. 3a). Each of these grooves communicate with the interior region defined by recesses 120b and 121b, and each is fitted with a semi-circular shaped rod of a transparent material which may preferably be Plexiglas. The rods 125a and 125b are positioned within these grooves to form a "light" conduit for a light source 126 positioned to the left of member 125b. A photo-cell device 127 is positioned to the right of member 125a. The thin diaphragm 122 is formed of a resilient material such as, for example, rubber or resilient plastic of relatively thin gauge and is free to undergo an appreciable amount of bending and/or stretching.

The operation of pressure-sensitive switch 15 is as follows:

Once compression of chamber 11 begins, the pressure differential across diaphragm 122 causes it to "bulge" in a direction shown by arrow 128 so as to assume the dotted line position 122'. Metallic screen 123 limits the amount of "bulging" which the diaphragm 122 may experience. In the dotted line position as shown, the diaphragm acts as a "shutter" blocking light rays emitted from light source 126 and pass through member 125b, from reaching member 125a and thereby from impinging upon the photo-cell device 127. The diaphragm remains in the dotted line position shown by numeral 122' until the pressure differential across diaphragm 122 reaches substantially zero, at which time the membrane returns substantially to the solid line position as shown in FIG. 3. This position permits light rays emitted from source 126 and passing through semi-circular rod 125b to, in turn, pass through rod 125a and thereby impinge upon photo-sensitive device 127 to generate a pulse which indicates a substantially zero pressure differential across the diaphragm. This pulse (in the case of pressure-sensitive switch 15) operates as a start pulse in the manner previously described. Obviously, the pressure-sensitive switch for unit 26 would operate in a similar manner to generate a start pulse while the units 15' and 26' would operate in a similar manner to generate respective stop or reset pulses. The diaphragm 122 has been found to be extremely sensitive and will undergo a significant amount of "bulging" so as to perform the "shutter" or blocking action to prevent light rays from source 126a from reaching photo-cell 127 until a zero pressure differential condition is reached.

Screen 124, provided on the opposite side of diaphragm 122, operates in a similar manner to screen 123 in order to prevent undue stretching or "bulging" of the membrane as a result of any reverse pressure differentials and thereby assures a long operating life for the thin membrane.

FIG. 4 shown an alternative embodiment for the present invention in which a simplified parts counting apparatus is depicted. The basic difference between the arrangement of FIGS. 1 and 4 is such that the smaller size container pairs 22–13 and 22'–23' are eliminated and their associated valves and pressure-sensitive switches are likewise eliminated. The remaining structure of FIG. 4 is thus identical to that shown in FIG. 1 and like components have been designated by like numerals.

The operation of the apparatus of FIG. 4 is as follows:

Compression of the chamber operates in the same manner as was previously described wherein valves 14 and 14' are normally opened by controlling their operating solenoids 14a and 14a' in the appropriate manner. The solenoids may be employed for simultaneous operation in place of the operating rod 46 previously described with regard to FIG. 1. Obviously, either arrangement may be employed with equal success. The large batch of components to be counted is contained within chamber 12'.

After the air in chambers 11–12 and 11'–12' has been decompressed and the transient adiabatic conditions have subsided, the solenoid controls 14a and 14a' are operated to close valves 14 and 14', respectively. Motor 29 is then operated in the reverse direction to begin the decompression operation. Since the pressure level in chamber 11 is significantly lower than the pressure level in chamber 11', the pressure-sensitive switch 15 will be the first to recognize a zero pressure differential to develop a pulse at its output terminal 15a. This pulse will be employed to enable bistable flip-flop 102 to cause the pulses developed by the photo-cell to be accumulated in counter 107. At some later time, pressure-sensitive switch 15' recognizes a zero pressure differential condition to develop a pulse at its output terminal 15a' which resets bistable flip-flop 102 to block any further pulses developed by photo-cell 33 from being passed into the counter. The counter may be directly connected to a logic circuit for converting the binary coded count into a decimal representation which may be then displayed by display device 112. The display of display device 112 may be presented in the form of a quantity representing volume which may then be converted into a total parts count by reference to a chart or table which sets forth the volume occupied by the part being counted. As another alternative, the output of counter 107 may be fed into a computer or other devices in which the total count stored therein is divided by the volume occupied per component to convert the output into a direct reading representing the total number of parts counted. This merely requires an adjustment or input to the computer of a quantity which represents the volume occupied by a part. Whereas the apparatus of FIG. 4 and its necessary electronics is simpler than that employed for the apparatus of FIG. 1, the system of FIG. 1 is considered to be superior for the reason that differences in the volume occupied by the parts being counted (due to normal manufacturing tolerances) may be compensated as a result of the use of a "sample" batch which averages out such differences.

It can be seen from the foregoing description that the present invention provides a novel relatively high speed counting device capable of counting large quantities of small parts in a rapid and accurate manner.

Although there has been described a preferred embodiment of this novel invention, many variations and modifications will now be apparent to those skilled in the art. Therefore, this invention is to be limited, not by the specific disclosure herein, but only by the appending claims. For example, the light-source-photo-cell structure may be replaced by a magnetic or mechanical structure.

As another alternative, the electronic circuitry employed for counting may be replaced by electromechanical means in instances where the counting speed is not great. As another alternative, motor means 29 may be employed for driving a pressurizing source which directly applies air under pressure to all four matched pairs of chambers simultaneously as the output shaft of the motor rotates. Simultaneous rotation of code wheel 31 provides an indication of the pressure flow simultaneously directed to the four matched pairs of chambers.

The embodiments of the invention in which an exclusive privilege or property is claimed are defined as follows:

1. Means for counting large groups of elements of substantially uniform size comprising:
   chamber means for receiving a group of elements;
   means for selectively pressurizing said chamber at a predetermined flow rate;
   pressure-sensitive means for sensing a predetermined pressure level in said chamber;
   means coupled to said pressurizing means for generating pulses representative of said flow rate;
   means for accumulating said pulses into a total pulse count;
   pressure-sensitive means for selectively connecting the output of said pulse generating means to said accumulating means until said predetermined pressure level is achieved;
   means coupled to said accumulating means for converting said count into a quantity representing the total number of elements in said group.

2. The apparatus of claim 1 wherein said pressurizing means is comprised of motor means having an output shaft;
   means mechanically coupled to said output shaft for pressurizing said chamber;
   said pulse means coupled to said motor means being further comprised of code wheel means being counted to rotate in unison with said output shaft;
   said code wheel means having a predetermined pattern provided thereon;
   sensing means positioned at adjacent said pattern for generating pulses as said pattern passes beneath said sensing means while said motor is energized.

3. The apparatus of claim 2 wherein said means mechanically coupled to said motor means for pressurizing said chamber is comprised of a cylinder and reciprocally mounted piston; and mechanical means for converting rotation of said motor output shaft into linear movement to said piston within said chamber.

4. A system for counting a large group of items of substantially uniform size comprising:

first and second chambers and first conduit means connecting their interiors;

a first pressure source coupled to one of said first and second chambers;

said first conduit means including first valve means movable between an opened and closed position;

third and fourth chambers and second conduit means connecting their interiors;

a second pressure source coupled to one of said third and fourth chambers;

said second conduit means including second valve means movable between an opened and closed position;

at least one of said first, second, third and fourth chambers having a removable cover for receiving a group of items to be counted;

first pressure-sensitive switch means communicating with one of said first and second chambers;

second pressure-sensitive switch means communicating with at least one of said third and fourth chambers;

means for simultaneously activating said first and second pressure sources;

code generating means coupled to said activating means for generating pulses when said pressure sources are activated;

counter means;

gating means for coupling the output of said pulse generating means to said counter means, said gating means having means coupled to said first pressure-sensitive switch means for enabling said pulses to be accumulated in said counter means when said first pressure-sensitive switch means detects a first predetermined pressure level;

said gating means being further comprised of means coupled to said second pressure-sensitive switch means for blocking pulses generating by said pulse generating means from entering said counter means when said second pressure-sensitive switch means detects said first pressure level.

5. The apparatus of claim 4 further comprising fifth and sixth chambers and third conduit means connecting their interiors;

a third pressure source coupled to one of said fifth and sixth chambers;

said third conduit means including third valve means movable between an opened and closed position;

seventh and eighth chambers and fourth conduit means connecting their interiors;

a fourth pressure source coupled to one of said seventh and eighth chambers;

said fourth conduit means including fourth valve means movable between an opened and closed position;

at least one of said fifth, sixth, seventh and eighth chambers having a removable cover for receiving a second group of items to be counted wherein said second group is substantially smaller in number than the group of items inserted in said one of said first, second, third and fourth chambers;

third pressure-sensitive switch means coupled to one of said fifth and sixth chambers;

fourth pressure-sensitive switch means coupled to one of said seventh and eighth chambers;

said third and fourth pressure sources being coupled to said motor means to operate simultaneously with the operation of said first and second pressure sources;

second counter means;

a second gating means coupled between said pulse generating means and said second counting means and including means coupled to said third pressure-sensitive switch means for enabling pulses generated by said pulse generating means to be accumulated in said second counter means, and including second means coupled to said fourth pressure-sensitive switch means for preventing pulses from said pulse generating means from being passed to said second counter means whereby said third and fourth pressure-sensitive switch means are each operative to generate control pulses upon detection of said first predetermined pressure condition.

6. The apparatus of claim 5 wherein each of said pressure-sensitive switch means is comprised of:

a pair of enclosure members each having a centrally located recess;

said members being joined along their marginal edges with said recesses being in communication with one another;

each of said enclosure members having a small opening extending from its associated recess to the opposite surface of the enclosure member;

a thin resilient member being positioned between said joined members and having its marginal periphery secured between the marginal edges of said enclosure members to isolate said openings from one another;

at least one of said enclosure members having a pair of grooves arranged on opposite sides of their associated recess and being colinear with one another;

means positioned adjacent one end of said grooves for directing light rays through the adjacent groove, the associated recess and the remote groove;

light-sensitive means for generating an output signal being positioned adjacent said remote groove to pick up light rays passed therethrough;

said thin resilient member being adapted to deflect in the direction of said grooves when the pressure differential on opposite sides of said thin resilient member is such that the pressure on the side of the enclosure member having said grooves is less than the pressure on the side of the remaining enclosure member, whereby said deflection blocks light rays from passing from said light source to said light-sensitive means until said pressure differential is reduced to substantially zero value.

7. The apparatus of claim 5 further comprising means for dividing the count accumulated in said first counter means by the count accumulated in said second counter means to generate a count representative of the total number of parts contained within said one of said first, second, third and fourth chambers.

8. The apparatus of claim 5 further comprising display means for displaying in decimal fashion the output of said dividing means.

9. The apparatus of claim 5 further comprising print-out means coupled to said divider means for printing out in decimal fashion the count developed by said dividing means.

* * * * *